UNITED STATES PATENT OFFICE.

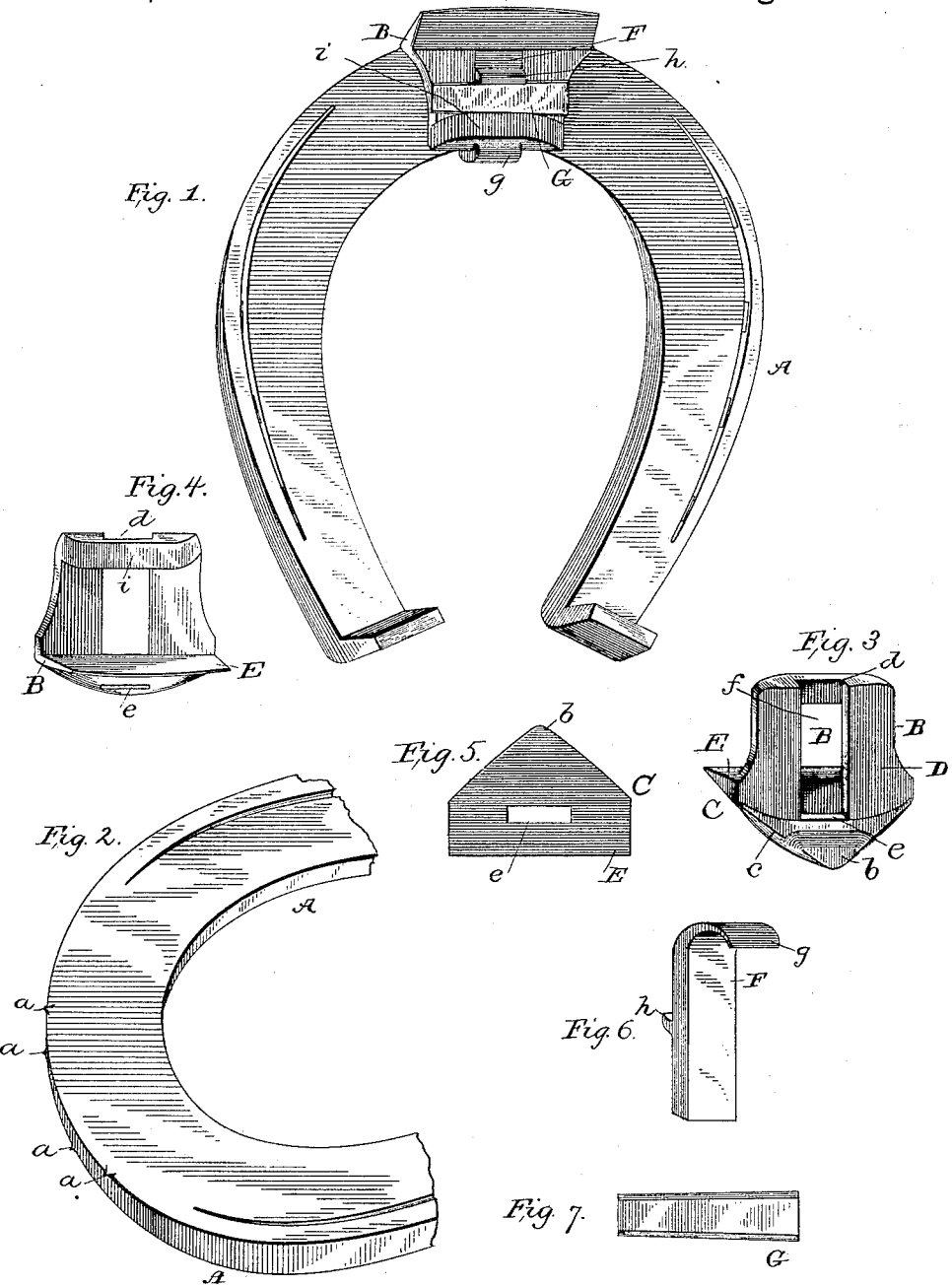

JOHN ADAMS, OF PIQUA, OHIO.

TOE-CALK FOR HORSESHOES.

SPECIFICATION forming part of Letters Patent No. 325,145, dated August 25, 1885.

Application filed July 11, 1884. (Model.)

*To all whom it may concern:*

Be it known that I, JOHN ADAMS, a citizen of the United States of America, residing at Piqua, in the county of Miami and State of Ohio, have invented certain new and useful Improvements in Removable Toe-Calks for Horseshoes, of which the following is a specification, reference being had therein to the accompanying drawings.

This invention relates to improvements in that class of horseshoes which are provided with removable toe-calks.

The invention consists, primarily, in the construction of the removable toe-calk, and in devices for securing the same in position upon the shoe, with capability of ready removal therefrom whenever desired, the several parts being constructed and arranged to permit of the placing in and removal from position of the calks without interfering with the hoof of the horse or other animal, or requiring any shifting or interference with the shoe. The invention will be hereinafter fully described and specifically pointed out in the description following.

In the accompanying drawings, Figure 1 represents a perspective view of the under side or tread of a horseshoe having my improvements in position thereon. Fig. 2 represents a perspective view of the toe portion of a shoe constructed according to my improvements. Fig. 3 represents a perspective view of the toe-calk separately, and Fig. 4 represents a perspective view of the removable calk and clip viewed from the upper side. Fig. 5 represents a front elevation of the combined toe-calk and clip. Figs. 6 and 7 represent detail views of the devices for securing the calk in position on the shoe.

A represents a horseshoe of ordinary construction, except that in the example shown the shoe is at the front edge or toe portion, provided with nicks or lugs *a*, between which the calk is placed and secured. These nicks or lugs serve to hold the calk from sidewise movement, and thus aid to secure it in position on the shoe.

B represents a toe-calk constructed according to my invention. This calk is designed to be constructed of steel; but it may be made of other suitable or desired material, and is formed by casting, forging, or in any of the usual modes. This removable calk and clip B consists of a front portion or head, C, and a rearwardly-extending portion, D, the head C having the customary clip, *b*, extending upward therefrom, for the purpose of affording a rest or stop for the front of the hoof of the horse and a calk, E, on its under side. The clip *b* is formed with an inwardly-extending lip or flange, *c*, having a flat under side, and which rests upon the upper face of the shoe, so as to afford firm bearing at that portion for the combined clip and calk-piece B. The upper face of the rearwardly-extending plate or portion D is flat, to permit of its resting snugly against the under face of the shoe, as shown. Consequently when the calk and tip-piece is in position it has firm bearing upon and against both sides or faces of the shoe.

*d* represents a longitudinal slot or recess which is formed in the upper face of the plate or extension D, and extends through the head C, to permit of the front end of a hooked bar, F, to be presently described, resting therein. The bar or plate F is designed to clamp the shoe and toe-piece together, and, as clearly shown in Fig. 6, has its inner or rear end formed of hook shape, and has on its under or outer face an outwardly-projecting lug, *h*.

The combined toe-calk and clip is adapted for use on shoes of somewhat different widths, and the attachment is thus applied: The bar F is first placed against the under face of the shoe, with that portion upon which the lug *h* is extending outward, and with the hook *g* against the inner edge of the shoe. Then the extension-plate is placed against the under face of the shoe, with the head portion C resting against the toe of the shoe and between the nicks or lugs *a*. The clamping-bar F is then forced through and along the continuation or recess *d*, and through the slot *e* thereof in the head C until the hook *g* impinges against the inner edge of the toe of the shoe. Then a wedge-shaped key or bar, G, is inserted and pushed between the rear edge of the lug *h* on the clamping-bar F and the forward edge of a lug or lip, *i*, at the inner end of the extension-plate D until the clamping-bar F is rigidly secured in position, whereupon the attachment is securely held to the shoe. So long as a portion of the bar F enters the front portion of the slot *d* and the hook *g* grips the inner edge of the shoe the wedge will hold the attachment securely in position. Consequently it will be observed the attachment is adapted for use upon shoes somewhat differing in width from the outer to the inner edges, the wedge-shaped key being capable of holding the parts in position whatever the space between the lug $h$ and the lug $i$.

The calk may be of any shape and size. The parts may be made of any desired or suitable material—such, for instance, as malleable cast-iron or steel.

It will be observed that all the clamping parts are on the under side of the shoe. Hence the attachment can be readily placed in position and removed therefrom without disturbing the shoe, and there are no parts that require to be attached to the hoof of the horse or to the shoe except by a clamping pressure, and no special construction of shoe or previous preparation thereof is necessary to adapt the same to receive my improved attachment.

Having thus described my invention, what I claim is—

1. The combination, with a horseshoe, of the combined toe-calk and clip herein described, having a rearwardly-extending slotted plate, a hooked bar adapted to rest within said slotted plate and grasp the shoe, and a key or bar adapted to grip said hooked bar and slotted plate, and clamp the same upon the shoe, substantially as set forth.

2. As an article of manufacture, a combined toe-calk and clip consisting of a front piece or head, C, having a toe-calk, E, a clip, $b$, having an inwardly-extending lip or flange, $c$, and a rearwardly-extending slotted plate, D, formed integrally therewith and with the slot extending through said head, a bar or plate adapted to fit within the slotted plate D and the slotted head C, and having on its under face a lug, $i$, and at its rear end a hook, $g$, and a wedge-shaped key or bar for the purpose of removably securing the attachment to shoes of different widths, substantially as set forth.

3. The combination of a shoe, A, having lugs $a$ on its front edge, and the combined toe-calk and clip having a slotted front or head piece, C, adapted to rest between said lugs, a rearwardly-extending slotted plate, D, adapted to rest against and fit the under side of the shoe, a clamping-hook adapted to engage with the slotted head-piece C and slotted plate D, and also with the inner front edge of the shoe, and having a lug or projection, $h$, and a beveled key adapted to grip said plate D and lug $h$, and clamp the attachment to the shoe, substantially as and for the purpose set forth.

In testimony whereof I affix my signature in presence of two witnesses.

JOHN ADAMS.

Witnesses:
C. L. FILLEBROWN,
J. H. HATCH.